ID1270553B1

(12) United States Patent
Huke et al.

(10) Patent No.: US 11,270,553 B1
(45) Date of Patent: Mar. 8, 2022

(54) METHOD AND SYSTEM FOR INTEGRATING BANK DATA AND PLATFORMS ON A WAGERING PLATFORM

(71) Applicant: AdrenalineIP, Washington, DC (US)

(72) Inventors: Casey Alexander Huke, Washington, DC (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/071,365

(22) Filed: Oct. 15, 2020

Related U.S. Application Data (60) Provisional application No. 63/081,559, filed on Sep. 22, 2020.

(51) Int. Cl.
| | | |
|---|---|---|
| *G07F 17/30* | (2006.01) | |
| *G07F 17/32* | (2006.01) | |
| *G06Q 50/34* | (2012.01) | |
| *G06Q 20/10* | (2012.01) | |
| *G06Q 20/40* | (2012.01) | |
| *G06Q 20/02* | (2012.01) | |

(52) U.S. Cl.
CPC ......... *G07F 17/3244* (2013.01); *G06Q 20/02* (2013.01); *G06Q 20/108* (2013.01); *G06Q 20/4016* (2013.01); *G06Q 50/34* (2013.01); *G07F 17/3288* (2013.01)

(58) Field of Classification Search
CPC combination set(s) only.
See application file for complete search history.

(56) References Cited

U.S. PATENT DOCUMENTS

| | | | |
|---|---|---|---|
| 5,800,268 A * | 9/1998 | Molnick | G07F 17/32 463/40 |
| 7,716,113 B2 | 5/2010 | Crosthwaite et al. | |
| 7,996,297 B2 | 8/2011 | Crosthwaite et al. | |
| 8,282,471 B1 * | 10/2012 | Korner | G07F 17/3288 463/25 |
| 10,593,157 B2 | 3/2020 | Simons | |
| 2003/0022719 A1 * | 1/2003 | Donald | G07F 17/32 463/42 |

\* cited by examiner

*Primary Examiner* — William E Rankins
(74) *Attorney, Agent, or Firm* — Maier & Maier, PLLC (57) ABSTRACT

A system to provide the user of an in play wagering system in which all of the user's wallet information is handled by a third party bank network keeping user account information private from the wagering system while providing the wagering system with verification of the user's ability to cover the wager as well ensure the wager is below user specific risk limitations.

12 Claims, 4 Drawing Sheets

Content - High Level Diagram

Fig.1 Content - High Level Diagram

|  | Current Wager | | | |
| --- | --- | --- | --- | --- |
| User ID | Amount | Odds | Wagered Result | Actual Result |
| Joe Smith | $100 | +250 | First Down | First Down |
| Robert Jones | N/A | | | |
| ... | | | | |
| Susan Thomas | $50 | -150 | Incomplete | First Down |

Fig.2 User Database Data Content

Fig.3 Wagering Module Object Content

Fig.4 Verify Module Object Content

Fig.5 Payout Module Object Content

| User ID | Account Balance | Risk Limits | Account History |
|---|---|---|---|
| Joe Smith | $1,000 | 10% | JoeSmith.dat |
| Robert Jones | $2,000 | 10/1 | RobertJones.dat |
| ... | | | |
| Susan Thomas | $5,000 | $250 | SusanThomas.dat |

Fig.6 Account Database Data Content

METHOD AND SYSTEM FOR INTEGRATING BANK DATA AND PLATFORMS ON A WAGERING PLATFORM

CROSS-REFERENCE TO RELATED APPLICATIONS

The present patent application claims benefit and priority to U.S. Provisional Patent Application No. 63/081,559 entitled "METHOD OF USING A THIRD PARTY AS A BANK FOR WAGERING PLATFORM" filed on Sep. 22, 2020 which is hereby incorporated by reference into the present disclosure.

FIELD

The embodiments are generally related to integrating banking platforms for in-play sports wagering platforms.

BACKGROUND

With the U.S. Supreme Court invalidating the 1992 Professional and Amateur Sports Protection Act, legalizing sports gambling, there will be a proliferation of online platforms that allow users to wager on sports through their mobile devices. Users are faced with the choice of only using one platform for all their wagers, reducing their betting options, or giving their banking and/or credit details to multiple wagering platforms, potentially compromising their security.

As mobile app make wagering on sports easier and in-play betting makes wagering faster platforms and users need tools to ensure responsible gaming, such as wager amount or frequency limitations.

SUMMARY

The accompanying drawings illustrate various embodiments of systems, methods, and various other aspects of a bank network integrated into a gambling platform. One embodiment includes a system to provide banking services to users of gambling games, the system including a live event, a wagering network that hosts in-play wagering on live events; at least one bank network; and at least one risk limitation of the wagering network, where the bank network ensures wagers on the live event fall inside of the at least one s risk limitation before a wager is placed with the wagering network.

Another exemplary embodiment includes a computer implemented method for providing bank services to users of gambling games, including executing on a processor the steps of: providing a gambling game on a device; providing a portal to enter credentials associated with the gambling game; communicatively coupling the gambling game to a bank network having bank account information; setting at least one risk limitation on wagers made in the gambling game; accepting one or more wagers in the gambling game; comparing the one or more wagers to the at least one risk limitation; and allowing the wager if the risk limitations are satisfied, or preventing the wager if the risk limitations are not satisfied.

Still another exemplary embodiment includes a computer implemented method for providing third party banking services for gambling games, including executing on a processor the steps of displaying a gambling game on a device; displaying or more bank account options to couple with the gambling game; displaying risk limitations to select, the risk limitations associated with a coupled bank account; displaying one or more wagering options; displaying one or more made wagers; and displaying a message indicating that the one or more made wagers was prevented based on a comparison of any selected risk limitations to the wager indicating at least a risk limitation was not met.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated in the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
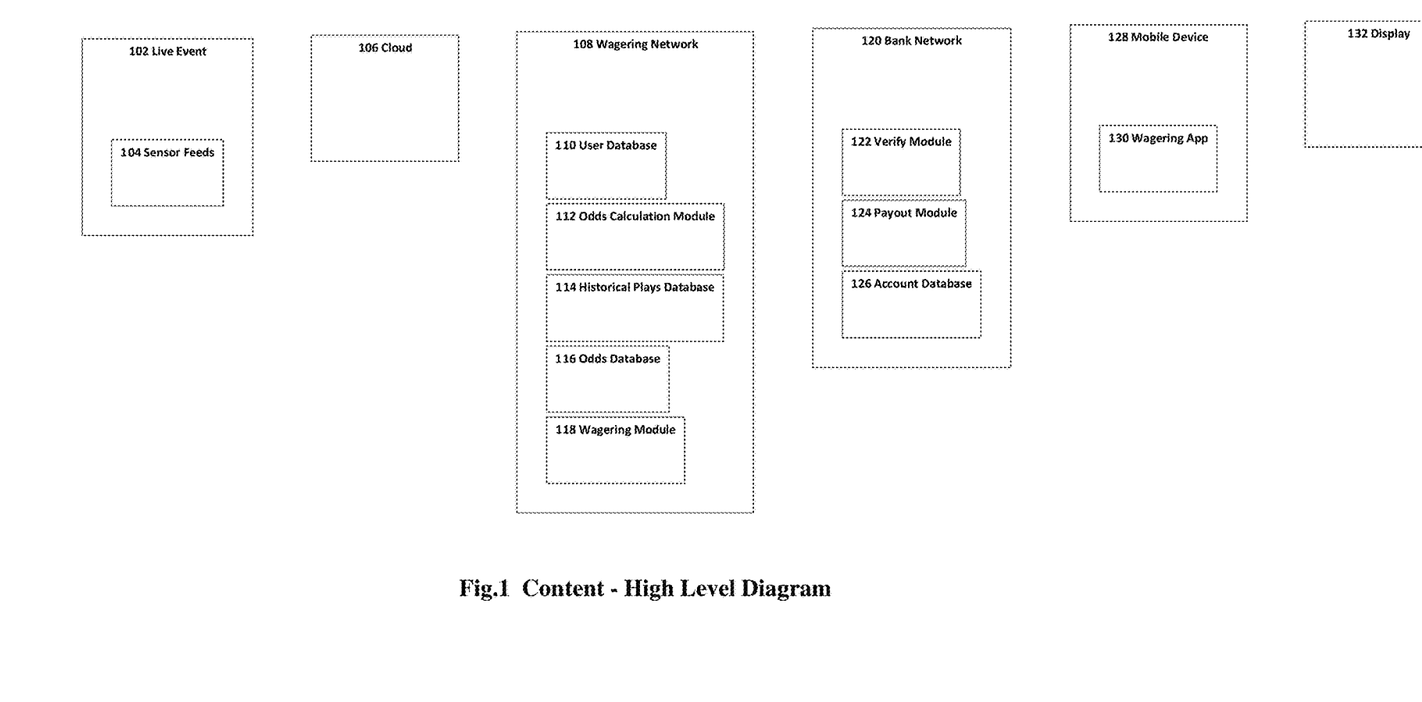
FIG. 1 illustrates a bank data and platform integration into a wagering platform, according to an embodiment.

FIG. 1 is a system for a bank data and platform integration into a wagering platform. This system may include a live event 102, for example a sporting event such as a football game, basketball game, baseball game, hockey game, tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover, if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half-time bets. Additionally, the sportsbook can offer futures bets on live events in the future. Sportsbooks need to offer payment processing services in order to cash out customers. This can be done at kiosks at the live event 102 or at another location.

Further, embodiments may include a plurality of sensors 104 that may be used such as motion sensors, temperature sensors, humidity sensors, cameras such as an RGB-D Camera which is a digital camera capture color (RGB) and depth information for every pixel in an image, microphones, radiofrequency receiver, a thermal imager, a radar device, a lidar device, an ultrasound device, a speaker, wearable devices etc. Also, the plurality of sensors may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that captures statistical information through real-time X, Y positioning of players and X, Y, Z positioning of the ball. In this embodiment only the video feed is used, but in other embodiments additional sensor data can be used to augment the accuracy of the probabilistic engine.

Further, embodiments may include a cloud 106 or communication network that may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable resources and higher-level services that can be rapidly provisioned with minimal management effort, often over the Internet and relies on sharing of resources to achieve coherence and economies of scale, like a public utility, while third-party clouds enable organizations to focus on their core businesses instead of expending resources on computer infrastructure and maintenance. The cloud may be communicatively coupled to wagering network 108 which may perform real time analysis on the type of play and the result of the play. The cloud may also be synchronized with game situational data, such as the time of the game, the score, location on the field, weather conditions, and the like which may affect the choice of play utilized. For example, in other exemplary embodiments, the cloud 106 may not receive data gathered from sensors and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various exemplary embodiments herein.

Further, embodiments may include a wagering network 108 which may perform real time analysis on the type of play and the result of a play or action. The wagering network 108 may also be synchronized with game situational data, such as the time of the game, the score, location on the field, weather conditions, and the like which may affect the choice of play utilized. For example, in other exemplary embodiments, wagering network 108 may not receive data gathered from sensors and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various exemplary embodiments herein. The wagering network can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can deliver engaging promotions to the user.

Further, embodiments may include a user database 110 which contains data relevant to all users of the wagering network 108, which may include, a user ID of the user, their current wager, the odds on that wager, the wagered upon results and the actual result. The user database 110 may also include a device identifier for their mobile device 128, a paired device identifier, wagering history on the user, etc.

Further, embodiments may include an odds calculation module 112 which utilizes historical play data, as well as a third party network's 122 analytics, to calculate odds for in-play wagers.

Further, embodiments may include a historical plays database 114, that contains play data for the type of sport being played in live event 102. For example, in American football for optimal odds calculation, the historical play data should include meta data about the historical plays, such as time, location, weather, previous plays, opponent, physiological data, etc.

Further, embodiments may include an odds database 116 that contains the odds calculated by the odds calculation module 122, and is used for reference by the path wagering module 122 to display the odds on either the user's mobile device 128 or a secondary display 132, and to take bets from the user through the mobile device wagering app 130.

Further, embodiments may include a wagering module 118 that allows the user to place wagers on individual plays inside of the live event 102 through the wagering app 130. The wagering module 118 displays the available wagers from the odds database 116 on either the mobile device 128 or a secondary display 132. The wagering module 118 will first verify that the user has a valid account with the bank network 120, and sufficient funds to place a given wager. Once a wager is placed, the live event 102 is monitored for the end of the play, in this example the whistle of the referee in an America football game. The actual play result is compared to the wager. The play result, wager, wager amount, and odds are then sent to the payout module 124 which will settle the wager. The wagering app 130 is then monitored for more wagers until the user logs off or the live event 102 is complete.

Further, embodiments may include at least one bank network 120 that hosts the users' account information kept in the account database 126, verifies for the wagering module 118 that the user has sufficient funds in their account to use the wagering app, or place an individual wager with the verify module 122, and settles the users' account based on the result of wagers placed through the wagering module 118 with the payout module 124. It may be understood that the bank network 120 may be directly integrated with the wagering platform or may be part of an external, or third party, bank network, or may be banking, account, or monetary information otherwise integrated into the wagering platform. Thus, in the embodiments, interactions with or actions taken with regard to data in the bank network 120 may be performed within the wagering platform or based on communications with a third party bank network. Further, it may be understood that the wagering platform may include an account or other database containing available money, points, credits, or the like that can be wagered. This account or other database may be communicatively coupled to an outside or third party bank account so as to provide for transfers of money, points, credits, or the like.

Further, embodiments may include a verify module 122 which handles queries from the wagering module 118 about the user's account status to ensure that they have the funds in their account to place wagers through the wagering app 130.

Further, embodiments may include a payout module 124 which is notified when the user places a wager on a completed play and delivers the amount of the wager, odds of the wager and the result of the play relative to the wager, such as a $100 wager that the next play will be a pass in American football, at +250 odds, with the result of the play being a pass. The payout module 124 will then retrieve the user's account information from the account database 126 and adjust the user's account balance, either down by the wager amount when the wagered upon result does not match the actual result, or as is the case in this example, the user keeps their original wager amount of $100, and gets an additional $250 as a result of the +250 odds on the wager. The user's account balance goes from $1000 before the wager to $1250 after the wager. Further, it may be understood that if an account balance is adjusted, that information is only known or reflected on the bank network 120. In other words, any user account information, such as monetary information, may be shielded from the wagering platform, such that the wagering platform cannot access or otherwise determine, for example, an amount of money a user has in an account on the bank network 120 or any other transactions that have taken place for a user on the bank network 120. Thus, in an embodiment, both the wagering platform and bank network 120 are secure. Further, in embodiments where the bank network 120 is housed on the wagering platform, any wagering game on the wagering network may only be provided information on funds related to a specific wager or to a risk limit, risk limitation, or other threshold, as described below, but may not be provided with a total amount of available funds (or points, credits, etc.) in an account on bank network 120.

Further, embodiments may include an account database 126 that houses the account information of the users of the bank network 120. This will include at least a user ID, account number, and current balance. It could also include additional user information, such as a device identifier, biometrics, passwords, etc.

Further, embodiments may include an embodiment includes a mobile device 128 such as a computing device, laptop, smartphone, tablet, computer, smart speaker, or I/O devices. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices allow for voice recognition and inputs, including, e.g., Microsoft KINECT, SIRI for IPHONE by Apple, Google Now or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also contain storage and/or an installation medium for the computing device. In still other embodiments, the computing device may have USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In this invention the user device could be an optional component and would be utilized in a situation in which the paired wearable device is utilizing the user device as additional memory or computing power or connection to the internet.

Further, embodiments may include a wagering app 130, which is a program that enables the user to place bets on individual plays in the live event 102, and display the audio and video from the live event 102, along with the available wagers, and statistical and analytical overlays on either the user's mobile device 128 or their display 132. The wagering app 130 allows the user to interact with the wagering network 108 in order to place bets and deliver payment/receive funds based on wager outcomes.

Further, embodiments may include a display 132, such as a television, smartphone, tablet, gaming console, etc., on which the live event 102, along with the available wagers, and path overlays can be displayed on instead of, or in addition to being displayed on the mobile device 128.

Figure 2:
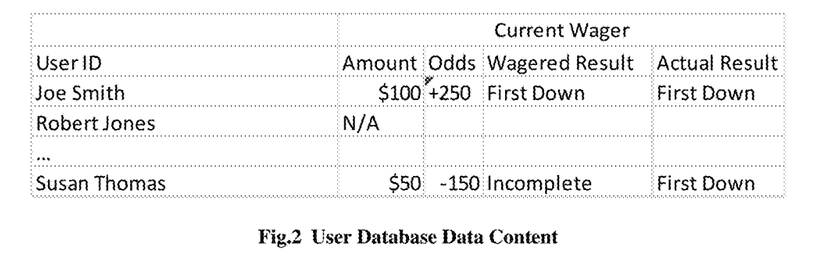
FIG. 2 illustrates a user database, according to an embodiment.

FIG. 2 illustrates the user database 110. The user database 110 contains information related to all users of the wagering app 132. This may include a used identification, in this example the user's name, along with data about their current wager, including the wager amount, wagered upon amount and the odds of the wager. The database could also contain additional information about the user, such as a device ID, their wagering history, geolocation, favorite teams, players, sports, etc.

Figure 3:
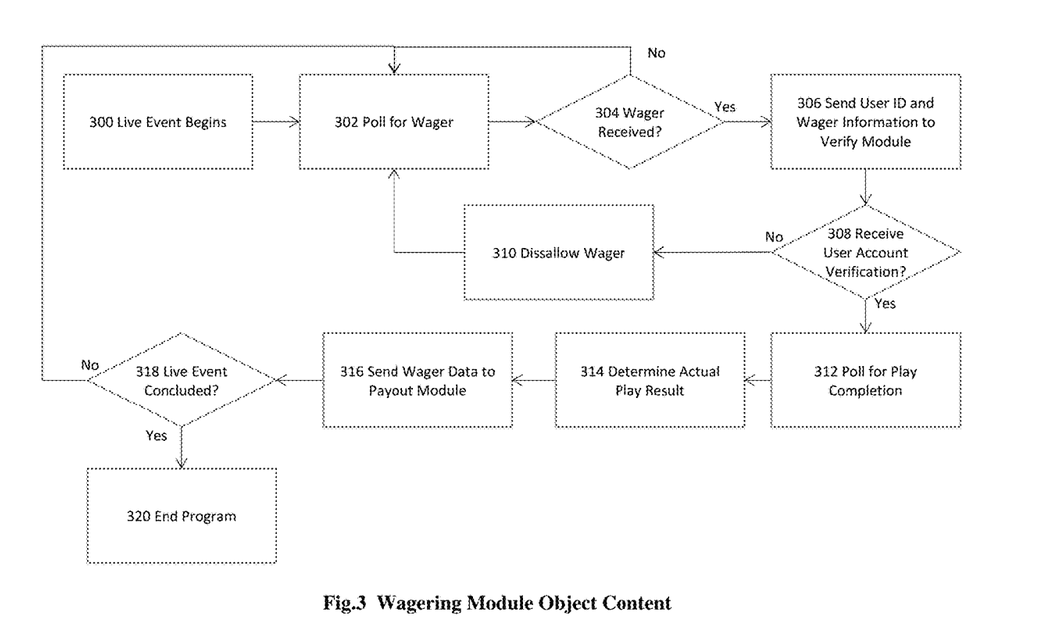
FIG. 3 illustrates a wagering module, according to an embodiment.

FIG. 3 illustrates the wagering module 118. The process begins with the start of the live event 102, at step 300. The wagering module 118 then polls, at step 302 for wagers made by users of the wagering app 130 on the live event 102. The wagering module 118 returns to step 302 if no wager is received, at step 304. In this example, the user Joe Smith is placing a $100 wager at +250 odds that the next play between the Green Bay Packers and the Chicago Bears will be a completed pass by the Green Bay Packers, and user Susan Thomas is wagering $200 at +150 odds that the same play will be a run. The user ID, wager amount and odds of the wager are sent, at step 306 to the verify module 122 on the bank network 120. A verification or declination of the wager is then received, at step 308 by the wagering module 118 from the verify module 122. If the wager was declined, the wager is disallowed, at step 310 and the wagering module 118 returns to step 302. If the wager is verified, at step 308 the sensor feeds 104 are polled, at step 312 for the completion of the wagered upon play. When it is determined that the play has been completed, such as by the referee's whistle in an American football game, the actual result of the play is determined, at step 314. The wager data, including the amount of the wager, wagered upon result, odds of the wager and the actual play result, are sent, at step 316 to the payout module 124. The wagering module 118 then determines, at step 318 if the live event 102 has concluded. If the live event 102 has not concluded, the wagering module 118 returns to step 302. If the live event 102 has concluded the wagering module 118 ends, at step 320.

Figure 4:
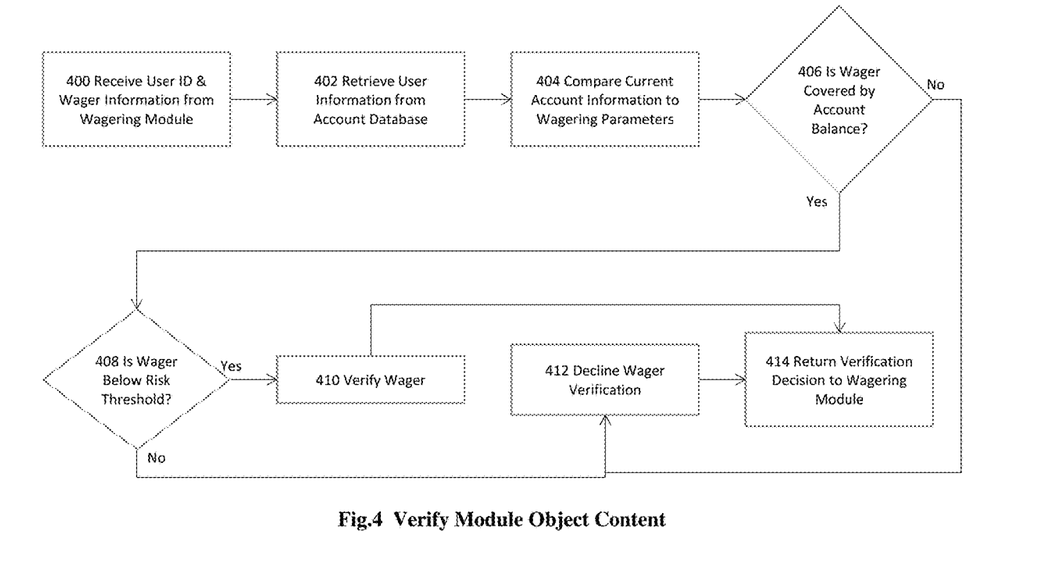
FIG. 4 illustrates a verify module, according to an embodiment.

FIG. 4 illustrates the verify module 122. The process begins with the verify module 122 receiving a user ID and information related to a wager made by that user from the wagering module 118, at step 400. The information related to that user is then retrieved from the account database 126, at step 402. The user's current account information, including account balance and risk thresholds, is compared to the wager information, including amount of the wager and the odds, at step 404. The first verification step is for the verify module 122 to determine that the user's account balance is greater than the wager amount, at step 406. If the wager amount exceeds the account balance of the user, the verify module 122 proceeds to decline the wager at step 412. If the wager amount is below the account balance, the wager amount is compared to the user's risk limits, at step 408. In this example, the user Joe Smith's wager of $100 is below both his account balance of $1000 and his risk limit of 10% of his account balance, which is $100. This wager is approved, at step 410. If the wager amount exceeds the risk limit of the user, the wager is declined, at step 412. The verification or declination of the wager is then returned to the wagering module 118, at step 414. In other examples, it may be appreciated that an account balance may act as the risk limit or risk limitation, or otherwise act as a threshold which could be utilized by the verify module 122 to accept or decline a wager.

Figure 5:
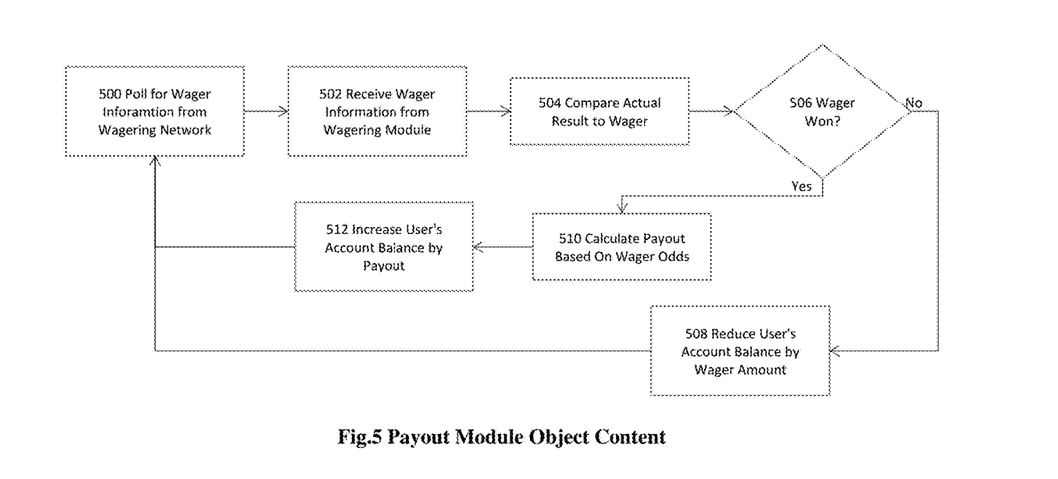
FIG. 5 illustrates a payout module, according to an embodiment.

FIG. 5 illustrates the payout module 124. The process begins with the payout module 124 polling, at step 500 the wagering network 108 for a wager made through the wagering module 118. The wagering module 118 delivers to the payout module 124 with information related to the wager at step 502, including at least, the wager amount, the odds of the wager, the wagered upon result of the play, the actual result of the play, and the user who made the wager. The actual result of the play is then compared, at step 504 to the wagered upon result of the play. For example, the user Joe Smith wagered $100 that the play would be a completed pass, while user Susan Thomas wagered $200 on the play being a run. The actual result of the play was a pass. The payout module 124 determines, at step 506 that user Joe Smith won his wager and user Susan Thomas lost her wager. If the user lost their wager their account balance is reduced, at step 508 by the wager amount. In this example, user Susan Thomas wagered $200, so her account balance would be reduced from $5000 to $4800 in the account database 126. If the user's wagered upon result matches the actual result of the play, the payout to the user is calculated, at step 510 based on the wager amount, in this example $100, and the odds, in this example +250, resulting in a payout of $250. The user's account balance in the account database 126 is then increased, at step 512 by the payout amount. In this example user Joe Smith's original account balance of $1000 increases to $1250 based on wining a wager of $100 at +250 odds. The payout module 124 then returns to step 500 polling for more wager results being sent from the wagering network 108.

Figure 6:
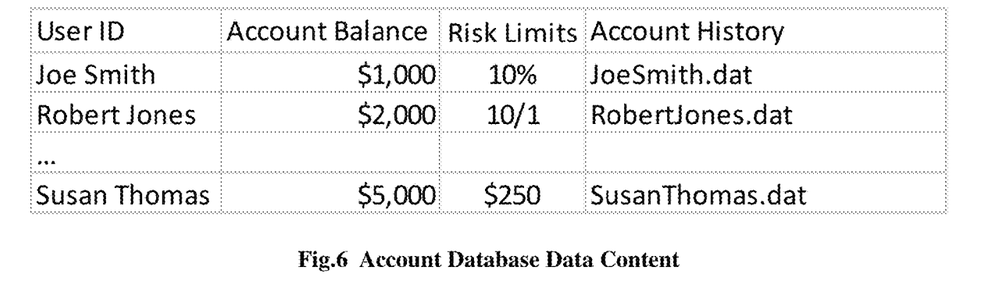
FIG. 6 illustrates an account database, according to an embodiment.

FIG. 6 illustrates the account database 126. The account database 126 contains the account information for users of the bank network 120. This may include, a user identifier, such as an account number, the balance of the user's account(s), the risk limits on their account, and the account's history. The user identification can be a simple one to one relationship of an ID or name, as it is in this example, but could also be done through any of a variety of encrypted methods. Each user's current account balance, in this example is in US dollars. Each user has risk limits associated with their account. These risk limits are set by the user in this example, but could also be imposed by the bank network 120 based on user history, credit worthiness, account balance, etc. In this example the users have set limits in terms of the maximum amount of money they can wager on a single bet, such as user Susan Thomas's $250 bet limit, in terms of a percentage of their account, such as user Joe Smith's 10% limit which would prevent him from wagering more than $100 on a single bet given his current $1000 account balance, and in terms of odds, such as user Robert Jones's limit of 10 to 1 odds preventing him from wagering on longshots. This example contains the user's account history and related information stored as a data file, but there are numerous ways known in the art for bank account record keeping that could be used in this database.

The foregoing description and accompanying figures illustrate the principles, preferred embodiments and modes of operation of those embodiments. However, the embodiments should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system to provide banking services to users of gambling games for gambling on a live event, the system comprising:
    a wagering network that hosts in-play wagering on the live event;
    at least one bank network; and
    an account database comprising data representing at least one risk limitation,
    wherein the at least one risk limitation is less than an amount of total funds available in an account;
    the bank network ensures wagers on the live event fall inside of the at least one risk limitation after a wager is selected but before the wager is placed with the wagering network, and
    the bank network is integrated on the wagering network.

2. The system of claim 1, further comprising a verify module that performs a comparison of user bank account information with wager information.

3. The system of claim 2, wherein the bank account information comprises at least one of account balance and the at least one risk limitation.

4. The system of claim 2, wherein the wager information comprises an amount of the wager and odds associated with the wager.

5. The system of claim 2, wherein the verify module compares account balance of the user to the wager amount and, if the account balance is less than the wager amount, declines the wager on the wagering network.

6. The system of claim 5, wherein if the verify module compares the wager amount to the one or more risk limits of the user, and, if the wager amount exceeds any one of the one or more risk limits, decline the wager on the wagering network.

7. The system of claim 1, further comprising a payout module, and the payout module queries if a wager has been made on the wagering network by a user and, if a wager has been made by the user, receives a wager amount, odds of the wager, results of a play associated with the wager, results of the wager, and information about the user.

8. The system of claim 7, wherein the payout module acts to add funds to the account of the user if a wager is successful and takes funds from the account of the user if the wager is unsuccessful.

9. The system of claim 1, wherein the at least one risk limitations of the user are set by one of the user, the wagering network, and a holder of the account of the user.

10. The system of claim 1, further comprising adjusting the an account balance on the bank network based on the wager outcome while shielding banking data of the account from the wagering network.

11. The system of claim 1, wherein the risk limitation is determined before a first wager on the live event.

12. The system of claim 1, wherein the wagering platform is not provided with a total amount of funds.

\* \* \* \* \*